June 12, 1945.   L. M. BAILEY   2,377,848
SELECTIVE CONVEYER
Filed July 10, 1944   3 Sheets-Sheet 1
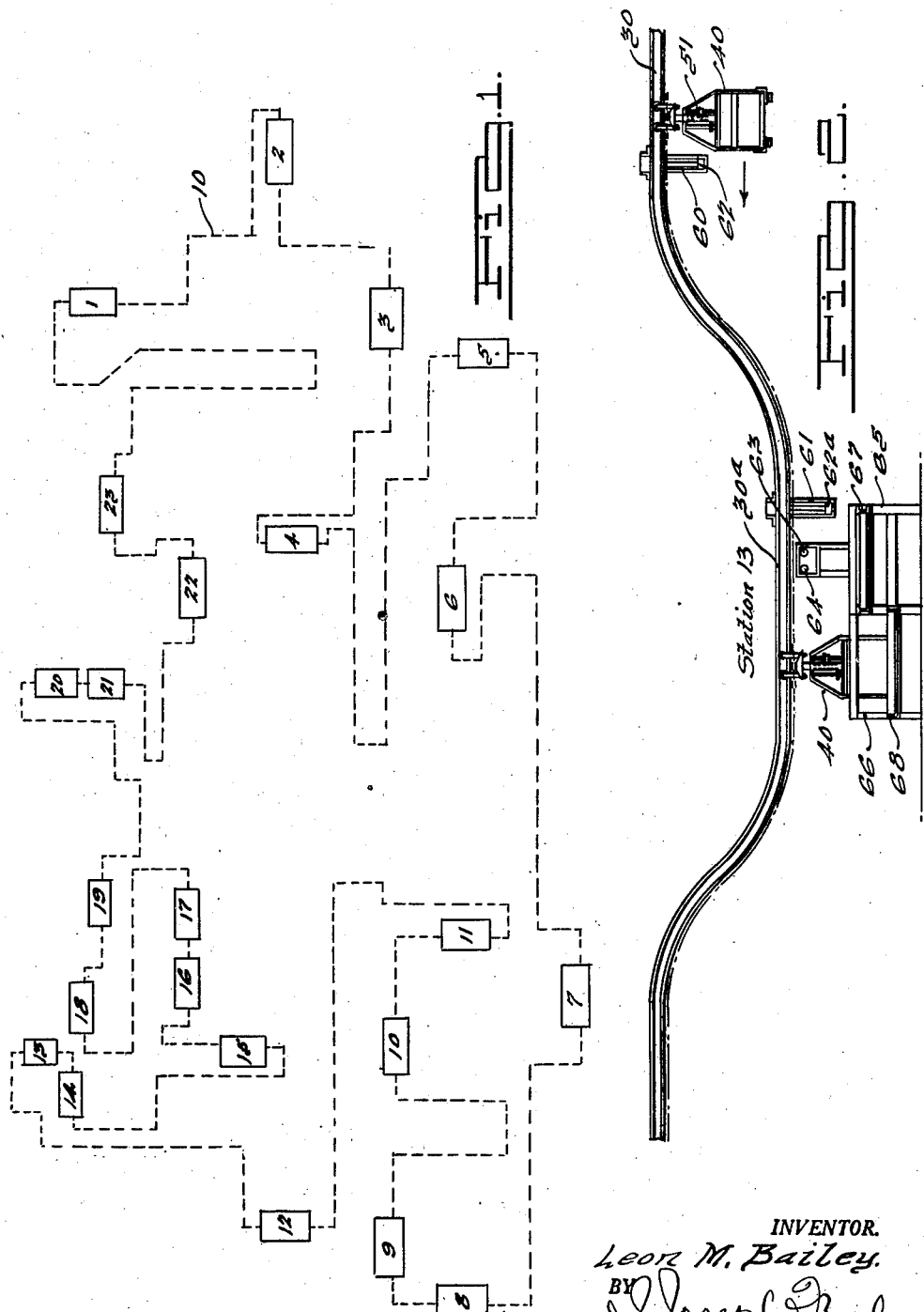
INVENTOR.
Leon M. Bailey.
BY Joseph Farley
ATTORNEY.

June 12, 1945.  L. M. BAILEY  2,377,848
SELECTIVE CONVEYER
Filed July 10, 1944  3 Sheets-Sheet 2

INVENTOR.
Leon M. Bailey.
BY Joseph Varley
ATTORNEY.

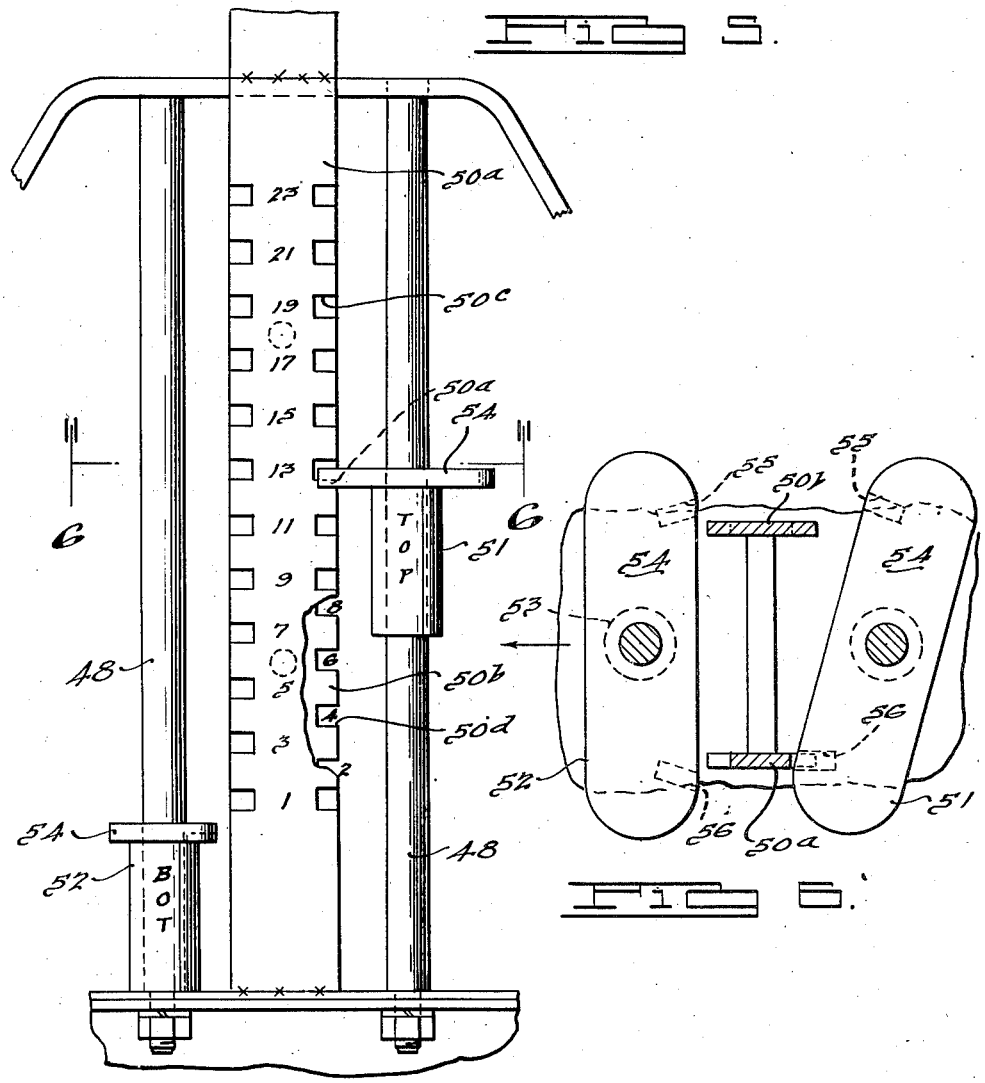

Patented June 12, 1945

2,377,848

UNITED STATES PATENT OFFICE 2,377,848

SELECTIVE CONVEYER

Leon M. Bailey, Nutley, N. J., assignor to Palmer-Bee Company, Detroit, Mich., a corporation of Michigan Application July 10, 1944, Serial No. 544,246

5 Claims. (Cl. 198—38)

This invention relates to conveyers and has for its principal object to provide a new and improved construction and arrangement for a conveyer system of the type wherein material may be loaded at a certain station upon load carrying devices with which the conveyer is equipped for transportation to any pre-determined one of a number of receiving or unloading stations and the said load carrying devices are equipped with a selector device which may be manually set or adjusted to produce actuation of a signal at the pre-determined station at which the material is to be unloaded or, in the alternative, to operate an automatic unloading device at such station.

Another object of the invention is to provide the load carrying trolleys of a conveyer of the overhead trolley type with manually adjustable means whereby tripping devices may be set as required or desired to actuate a signal at any one of a number of unloading stations or to actuate an automatic unloading device at such station.

The use of overhead trolley conveyers in mass production plants has become increasingly more common during the past several years. The overhead trolley type of conveyer, in addition to possessing the advantage of relatively low installation and maintenance cost, also possesses the advantage of enabling large quantities of material to be removed from the floor of the plant and carried overhead adjacent to the ceiling thereof, thereby avoiding over-crowded floor conditions and thus leaving more floor space available for carrying on manufacturing operations. In addition, the overhead trolley conveyer lends itself readily to its use of what may be termed a storage reservoir for material which otherwise would have to be stored in storage bins or piles upon the floor of the plant. It is more or less universal practice in modern plants devoted to the mass production of goods to route the material being fabricated so that such material will flow in a stream from a receiving station or stations where the raw material is received to various intermediate processing or fabricating stations until the goods or articles being fabricated are completed at a final station. If, as is usually the case, the article being fabricated in final form consists of a number of small parts upon which various different machining or other operations must be performed in accordance with the nature of the particular part, it is highly desirable to provide a conveyer system on which such various parts are carried by the conveyer to certain pre-determined loading and unloading stations.

The present invention has for one of its principal objects to provide a conveyer system of the type described.

A further object of the present invention is to provide a new and improved construction for a load carrying trolley for an overhead trolley conveyer system of the type described and to incorporate with such trolley manually adjustable selector means which, as the trolley approaches a pre-determined station, will actuate either a signal device or an automatic unloading device.

The above and other objects of the present invention will appear more fully from the following more detailed description and by reference to the accompanying drawings forming a part hereof and wherein:

Fig. 1 is a diagrammatic view of a commercial installation of an overhead trolley conveyer system constructed in accordance with the principles of the present invention;

Fig. 2 is a side elevation of a section of the conveyer showing a load carrying trolley located at a loading or unloading station and a second trolley approaching such station;

Fig. 5 is a further enlarged detail of the selector mechanism incorporated in the structure shown in Figs. 3 and 4, and Fig. 6 is a section on the line 6—6 of Fig. 5.

Figure 3:
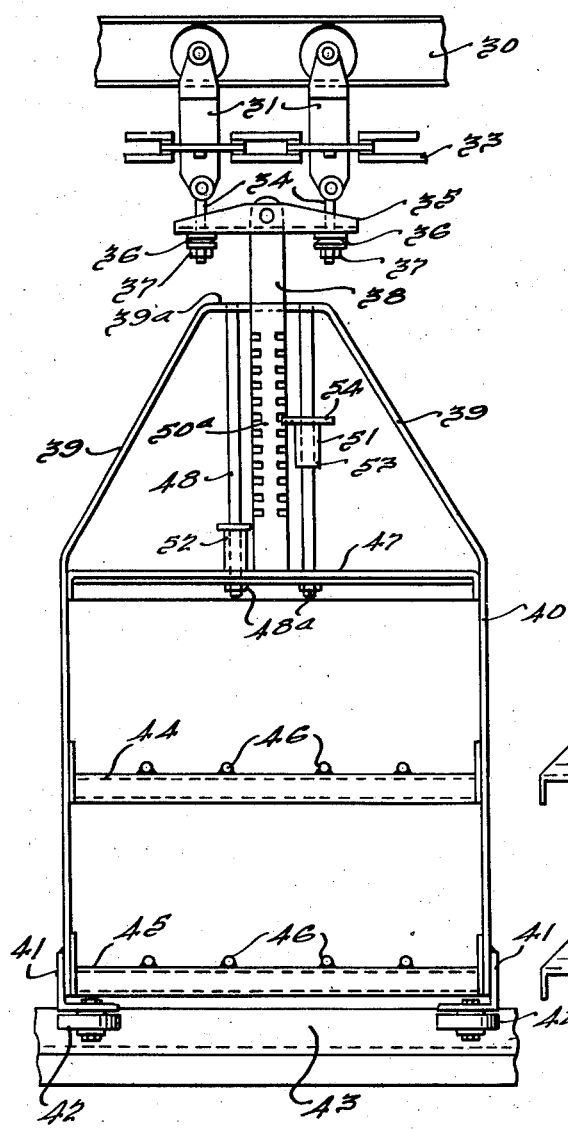
Fig. 3 is an enlarged side elevation of a load carrying trolley.

As shown in Fig. 1 of the drawings, the line of travel of the conveyer is illustrated by the dash line 10. As illustrative of an embodiment of the invention that has proven highly satisfactory in commercial use and not as limiting the scope of the invention, there is shown in Fig. 1, a plurality of stations, which for purposes of illustration are numbered from 1 to 23, inclusive, located adjacent to floor areas devoted to certain manufacturing operations. In the particular constructional example diagrammatically illustrated in Fig. 1, station 1 is located adjacent to a floor area where stocks of raw material are stored; station 2 is located adjacent to a receiving area where incoming material is received; station 3 is located adjacent to a plurality of machine tools that are widely used for mass production which, in the installation depicted, are automatic boring machines of the type known as Bullard machines; station 4 is a line dispatching station where various parts are loaded on the conveyer and dispatched to various other stations along the conveyer's line of travel; station 5 represents a station where already fabricated parts which are purchased from sources of supply are received and loaded on the conveyer for dispatching to other stations; station 6 represents still another line dispatching station for loading other parts upon the conveyer; station 7 is located adjacent to a floor area where a preliminary fabricating operation is performed such, for example, as the removal of burrs from castings; station 8 represents an inspection station at which the raw material partly fabricated and purchased parts are inspected before re-routing the same to other stations for further manufacturing operations; stations 9 and 10 are adjacent to floor areas equipped with grinding machines where rough and finish grinding operations are performed; station 11 is located adjacent to a gear fabricating department; station 12, a further dispatching station; station 13, a normalizing heat treat station; station 14, a box room; stations 15, 16 and 17 are adjacent floor areas where drill press, milling and lathe operations, respectively, are performed; station 18, a wash station; station 19, a heat treat; station 20, plating; station 21, painting; while stations 22 and 23 may be for final operations or for unloading completely fabricated parts.

As shown in Fig. 2, the trolley conveyer consists of a supporting track 30 constructed of a structural iron I-beam suitably supported on the ceiling of the plant, which track dips downwardly as indicated at 30-a at each of the stations above described so as to bring the load carrying device adjacent to the floor level to be readily accessible to operatives stationed at the various stations.

Figure 4:
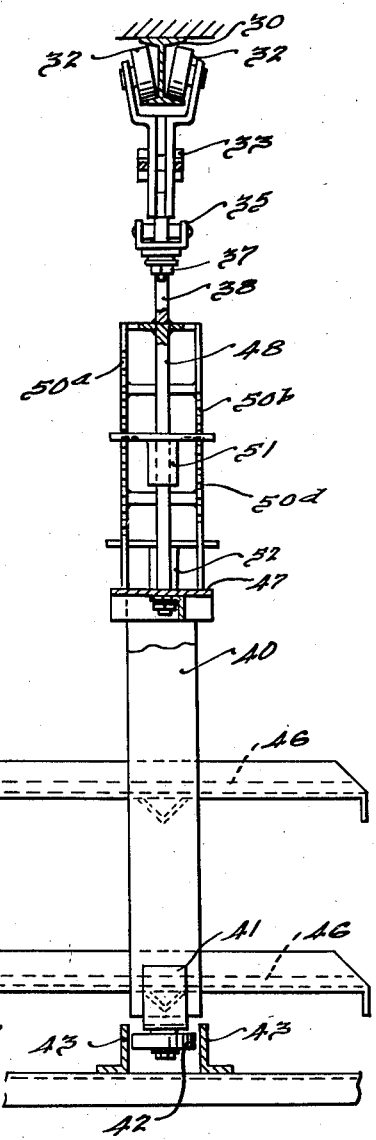
Fig. 4 is an end view of the structure shown in Fig. 3 with parts thereof broken away.

As shown best in Figs. 3 and 4, each load carrying device consists of a pair of trolley brackets 31, each of which carries a pair of trolley wheels 32 which engage the lower web of the I-beam 30 (see Fig. 4). The brackets 31 pass through the links of a propulsion chain 33 which is driven by any suitable driving means (not shown). At their lower ends each bracket has pivotally secured to it a bolt 34 which passes through a coupling bar 35, washers 36 being interposed between the coupling bar 35 and nuts 37 screwed upon the lower ends of the bolts 34. The washers 36 are so constructed as to permit swiveling of the coupling bar 35 with respect to the bolts 34 as the load carrying trolley travels over the inclined sections of the track in passing from the upper to the lower level thereof. Pivotally secured to the center of each coupling bar 35 is a load carrying bar 38 to which is welded or otherwise permanently secured the side bars 39 of a tray carrying frame, indicated generally by the reference character 40. The side bars 39 are preferably formed of a single piece of strap material bent to form an open framework, such as shown in Fig. 3. Attached to the lower ends of the side bars 39 are the angle brackets 41 which carry guide rollers 42 adapted to pass between the guide bars 43 which are located at the various stations for preventing side sway of the tray carrying frame 40. Secured between the side frame members 39 is a pair of tray carrying shelves 44 and 45 which are welded or otherwise suitably secured to the side frame members. Each shelf 45 has welded, or otherwise suitably secured to the top face thereof, a plurality of slide bars 46 upon which trays loaded with material may be readily slid on to, or off, of the respective shelves. A transverse cross-brace 47 spaced some distance from the top of the tray carrying frame 40 is also suitably secured to the side bar members 39. The upper ends of a pair of guide posts 48 are seated in holes provided in the top horizontal section 39-a of the frame 40; the lower reduced ends of said posts being threaded to pass through the cross-brace 47, and to receive nuts 48-a by means of which said posts are securely fastened to said frame. A pair of strap iron locking bars 50-a, 50-b have their upper and lower ends secured to the section 39-a and the cross-brace 47, respectively.

As shown in Figs. 3 to 6, inclusive, of the drawings, the bar 50-a is provided with a plurality of notches 50-c which, as shown best in Fig. 5, are numbered with the odd numbers corresponding to the odd-numbered stations, while the bar 50-b is provided with notches 50-d numbered with even numbers to correspond with the even-numbered stations. Slidably mounted on the guide posts 48 is a pair of signal trips 51, 52, each of which consists of a sleeve or boss 53 surmounted by an elongated flat plate 54 provided in its lower face with a pair of notches 55, 56 which are adapted to be engaged respectively with the bars 50-a, 50-b.

As shown best in Fig. 6, the notches 55, 56 are cut into the lower face of the top plate 54 at an angle such that the notches will lie substantially parallel to the respective locking bars 50-a, 50-b when the signal trips 51, 52 are swung to engage the notches with the respective locking bars 50-a, 50-b.

As shown more clearly in Fig. 5, the odd-numbered notches 50-c in the bar 50-a are arranged in staggered relationship with respect to the even-numbered notches 50-d in the bar 50-b. When one of the signal tripping members as, for example, the member 51 is engaged with any one of the notches in either of the bars, the signal tripping device is locked in position at a pre-determined level for engagement with the signal actuating members 60, 61 which, as shown in Fig. 2, are located in advance of each of the respective stations along the conveyer's line of travel. Assuming that the station represented in Fig. 2 is station 13 and that the signal actuating member 51, as shown in Fig. 5, has been engaged with the notch 13 and that the upper tray of the tray carrying frame 40 shown at the right is one which is to be unloaded at such station, when the tray reaches the signal actuating member 60 the signal trip 51 engages a switch actuator 62 and closes a current to a signal device which may be either a signal light or a bell, as indicated at 63. The current remains closed to this signal device until the tray reaches a second signal switch 62-a at the signal actuator 61 which causes the current to be closed to a second signal device 64 which may be either a light of different color or a bell having a tone different than the first warning bell. This serves to inform the operative that a carrier is in position at the unloading station and that the material must be removed immediately. It will, of course, be understood that each of the switches for the signals 63, 64 are arranged to remain closed for a pre-determined time interval depending upon the distance of the respective switch actuators from their particular station and the speed of travel of the conveyer. It will likewise be understood that the distance between a pair of actuators 60 and 61, or between an actuator 61 and its station, will be somewhat less than the distance between two adjacent load carrying devices on the conveyer so that when a switch is tripped it will be automatically reset for operation by the next succeeding load carrying device if the switch tripper thereof is set for the same station.

Each loading station is provided with a pair of tables 65, 66 which are provided with a plurality of gravity rolls 67, 68 with which the upper and lower shelves 44, 45, respectively, of the load carrying device are brought into alignment when the load carrying trolley reaches the station. Tote pans loaded with material and resting upon the gravity rollers 67 or 68 may be quickly and easily slid from the loading tables 65, 66 onto the slide bars 46 of the shelves 44, 45.

As will be evident from an inspection of Figs. 5 and 6 of the drawings, the signal tripping devices may be readily set or adjusted into engagement with any of the notches 50-c or 50-d in either of the bars 50-a or 50-b by sliding the signal tripping device along its respective guide rod 48 until the top plate 54 of the signal tripper is in alignment with any one of the notches, then rotating the tripper to swing the top plate thereof into the desired notch until the plate 54 abuts against the bottom of a notch 50-c or 50-d in either of the bars 50-a or 50-b, at which time one of the under-cut notches 55 or 56 will be in alignment with the respective bar. The signal tripper is then dropped so that, for example, the notch 56, as shown in Figs. 5 and 6 of the drawings, will straddle the side bar 50-a and will lock the signal tripping device securely in position. As indicated in the drawings, the two signal trippers 51 and 52 are employed so that the tripper 51 may be used, for example, for material to be transported on the top shelf 44 of the tray carrier 40 while the tripper 52 may be employed for material to be used by the bottom shelf 45 thereof.

The manner in which the device operates is as follows: let it be assumed that material is to be sent from any one of the dispatch stations numbered 1, 2, 4 or 6, which material is to be sent, for example, to station 13 for normalizing. Let it be further assumed that it is desired to load such material on the upper shelf 44 of a load carrying device. The material loaded in a tote pan which has been placed upon the rollers 67 of a table 65 is shoved onto the upper shelf 44 of the load carrying device and the signal tripper 51 of such device is placed into engagement with the notch 13 and locked in position by the engagement of the cut-away notch 56 with the locking bar 50-a. As the load carrying device 40 approaches station 13, the signal tripper 51 will engage with the switch actuator 62 at the signal actuator 60 to operate the signal device 63 and thereby warn the operative at station 13 that a load carrying tray is approaching the station containing material to be unloaded therefrom. When the load carrying tray reaches the station 13, the switch actuator 62-a of the signal actuator 61 will then be caused to be operated to cause the signal device 64 to be made operative and thereby notify the operative of the presence at the station of a load carrying device which it is necessary to unload immediately. When the operative removes the loaded tray from the load carrying device, he is required also to release the signal actuator and drop the same to the lowermost end of its respective guide rod 48 or, in other words, to move the signal tripper into the position, such as shown in Figs. 5 and 6 of the drawings, occupied by the switch tripper 52.

It will, of course, be understood that both of the shelves 44, 45, or either one thereof, may be loaded with a tote pan at any particular dispatching station and that each load on each shelf may be intended for removal or unloading at different stations along the conveyer's line of travel, in which case both of the signal switch trippers 51, 52 will be moved to engage within the proper notch corresponding to the station at which the unloading is to take place. It will likewise be understood that either shelf of any one of the load carrying devices may be loaded at different dispatch stations for removal either at the same or different unloading stations.

As will be seen from the foregoing description, a conveyer system constructed in accordance with the principles of the present invention has marked advantages from the standpoint of flexibility and economy of construction. The switch tripping members 51, 52 obviously may be adjusted with great ease and facility as the elongated flat plates 54 of either of the members 51, 52 may be readily swung into engagement with any one of the even or odd-numbered notches of either of the locking bars 50-a, 50-b, respectively. When a plate 54 has been swung into engagement with a notch of a locking bar, if the operative then releases the switch tripper, it will drop by gravity to cause either of the notches 55 or 56 of the plate 54 to engage the locking bar and securely lock the switch tripper against accidental displacement in the notch with which it has been engaged; the notch 56 not only holding the switch tripper in locked engagement by gravity but also holding it securely against pivotal movement when the tripper engages the particular switch which it is intended to actuate.

Although in the foregoing description certain stations have been identified as dispatch stations and other stations are identified as being associated with floor areas where certain definite fabricating operations are performed, it will, of course, be understood that this is merely illustrative, as obviously material may be sent from any station whatsoever along the conveyer's line of travel to any other station. It will likewise be understood that the particular arrangement of the conveyer's line of travel may be varied considerably from that shown in the diagrammatic view of Fig. 1 of the drawings. It will further be understood that various changes and modifications of the specific structural details may also be resorted to without departing from the principles of the invention as set forth in the claims hereunto appended.

I claim:

1. A conveyer system of the type wherein material may be transported by an endless conveyer having a plurality of spaced load carrying devices from any one of a plurality of loading and unloading stations to another pre-determined similar station located along the conveyer's line of travel, characterized by each of said load carrying devices being provided with a pair of locking bars in spaced transverse relationship to each other, each of said bars being provided with a plurality of spaced notches arranged in staggered relation to the notches of the other bar, a guide rod mounted adjacent to and between said locking bars, a switch tripping member slidably mounted upon said guide rod and pivoted thereon for movement into and out of engagement with any one of the notches on its respective said locking bars, and said switch tripping member and locking bars being provided with interlocking means for locking and holding said switch tripping member in an operative position when it is engaged with any one of said notches.

2. A conveyer system of the type wherein material may be transported by an endless conveyer having a plurality of spaced load carrying devices from any one of a plurality of loading and unloading stations to another pre-determined similar station located along the conveyer's line of travel, characterized by each of said load carrying devices being provided with a pair of load carrying shelves, a pair of locking bars each being provided with two sets of spaced notches, one set for each of said shelves and a pair of switch tripping members mounted for slidable and pivotal movement, one for each of said shelves and said notches, and each of said locking bars and said switch tripping members being provided with cooperating interlocking means to hold a switch tripping member in adjusted position when engaged within any one of said notches.

3. A conveyer system of the type wherein material may be transported by an endless conveyer having a plurality of spaced load carrying devices from any one of a plurality of loading and unloading stations to another pre-determined similar station located along the conveyer's line of travel, characterized by each of said load carrying devices being provided with a pair of vertically spaced shelves, a pair of gravity roll loading surfaces located at each of said stations for alignment with the spaced shelves of said load carrying device when said device reaches said station, and means for engaging said device at said station to hold the same against transverse movement during loading or unloading thereof, and each of said load carrying devices being provided with a pair of transversely spaced locking bars each having two sets of spaced notches therein, one set for each of said load carrying shelves, the notches of one bar being in offset staggered relationship to the notches of the adjacent bar, a pair of switch tripping members, one for each of said shelves, slidably and pivotally mounted adjacent said locking bars for engagement with the respective set of notches provided therein for said switch tripping member, and said locking bar and switch tripping member being provided with interlocking means to hold said switch tripping members in adjusted operative position when such switch tripping member has been engaged within any one of its respective notches.

4. A conveyer system of the type wherein material may be transported by an endless conveyer having a plurality of spaced load carrying devices from any one of a plurality of loading and unloading stations to another pre-determined similar station located along the conveyer's line of travel, characterized by each of said load carrying devices being provided with a pair of locking bars in spaced transverse relationship to each other, each of said bars being provided with a plurality of spaced stations arranged in staggered relation to the stations of the other bar, and a switch tripping member adapted for interlocking engagement with any one of the stations of said bars.

5. A conveyer system of the type wherein material may be transported by an endless conveyer having a plurality of spaced load carrying devices from any one of a plurality of loading and unloading stations to another pre-determined similar station located along the conveyer's line of travel, characterized by each of said load carrying devices being provided with a locking bar, said bar being formed with a plurality of spaced notches along one edge thereof, a guide rod mounted adjacent to said bar, a switch tripping member slidably mounted upon said guide rod and pivoted thereto for movement into and out of engagement with any one of said notches, an edge of said member being receivable in any one of said notches, said last-named edge having an undercut notch in the lower surface of said member where receivable in the first-named notches, said undercut notch having sufficient width to straddle the lower edge of the first-named notch in which it is received, the weight of said member being such as to maintain by gravity an interlock between said member and bar at the undercut notch and one of the first-named notches.

LEON M. BAILEY.